United States Patent
Kim et al.

(10) Patent No.: US 8,510,568 B2
(45) Date of Patent: Aug. 13, 2013

(54) METHOD AND APPARATUS FOR IMPORTING A TRANSPORT STREAM

(75) Inventors: Bong-seon Kim, Gyeonggi-do (KR); Young-sun Yoon, Gyoenggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1022 days.

(21) Appl. No.: 11/516,524

(22) Filed: Sep. 7, 2006

(65) Prior Publication Data

US 2007/0198858 A1  Aug. 23, 2007

Related U.S. Application Data

(60) Provisional application No. 60/773,340, filed on Feb. 15, 2006.

(30) Foreign Application Priority Data

Apr. 26, 2006 (KR) .................. 10-2006-0037718

(51) Int. Cl.
*G06F 21/00* (2006.01)

(52) U.S. Cl.
USPC ............. 713/189; 726/30; 713/151; 713/193; 380/43; 380/228; 709/229

(58) Field of Classification Search
USPC ........................................ 713/151, 163, 189
See application file for complete search history.

(56) References Cited

U.S. PATENT DOCUMENTS

| | | | |
|---|---|---|---|
| 6,097,842 A * | 8/2000 | Suzuki et al. ................. | 382/232 |
| 6,633,564 B1 * | 10/2003 | Steer et al. .................... | 370/389 |
| 6,668,320 B1 * | 12/2003 | Van Rijnsoever ............. | 713/151 |
| 6,788,710 B1 * | 9/2004 | Knutson et al. ............... | 370/535 |
| 6,912,655 B1 * | 6/2005 | Zucker .......................... | 713/163 |
| 7,055,039 B2 | 5/2006 | Chavanne et al. | |
| 7,082,198 B1 * | 7/2006 | Ishii .............................. | 380/239 |
| 7,237,108 B2 * | 6/2007 | Medvinsky et al. .......... | 713/160 |
| 7,336,783 B2 | 2/2008 | Park | |
| 7,336,787 B2 * | 2/2008 | Unger et al. .................. | 380/217 |
| 7,409,562 B2 * | 8/2008 | Kahn et al. .................... | 713/194 |
| 7,433,472 B2 * | 10/2008 | McLean et al. ............... | 380/255 |

(Continued)

FOREIGN PATENT DOCUMENTS

| | | |
|---|---|---|
| JP | 7-288798 A | 10/1995 |
| JP | 2001-86110 A | 3/2001 |

(Continued)

OTHER PUBLICATIONS

Communication dated Jun. 26, 2012 issued by the Japanese Patent Office in counterpart Japanese Application No. 2007-035315.

(Continued)

*Primary Examiner* — Morshed Mehedi

(74) *Attorney, Agent, or Firm* — Sughrue Mion, PLLC

(57) ABSTRACT

A content import method in a digital rights management (DRM) system imports transport streams received from outside a domain, generates a content file, and regularly inserts information in the form of transport packets necessary for decrypting encrypted content into a payload of the content file. Accordingly, even if usage constraint information (UCI) included in the received content changes, packaging is possible. When a device pertaining to the domain receives half of an imported content file via streaming, transport packets of the received half of the imported content file can be promptly decrypted without a time delay.

22 Claims, 10 Drawing Sheets

(56) References Cited

U.S. PATENT DOCUMENTS

| | | | |
|---|---|---|---|
| 7,657,032 B2 | 2/2010 | Sako | |
| 2002/0053082 A1* | 5/2002 | Weaver et al. | 725/46 |
| 2002/0150244 A1 | 10/2002 | Kim et al. | |
| 2002/0199148 A1* | 12/2002 | Krishnamachari | 714/752 |
| 2003/0081773 A1 | 5/2003 | Sugahara et al. | |
| 2003/0081778 A1 | 5/2003 | Tsumagari et al. | |
| 2003/0131114 A1* | 7/2003 | Scheidt et al. | 709/229 |
| 2003/0196113 A1* | 10/2003 | Brown et al. | 713/201 |
| 2004/0047594 A1* | 3/2004 | Towler | 386/46 |
| 2004/0052377 A1* | 3/2004 | Mattox et al. | 380/277 |
| 2004/0054892 A1 | 3/2004 | Ji et al. | |
| 2004/0165722 A1* | 8/2004 | Van Rijnsoever et al. | 380/43 |
| 2004/0249815 A1 | 12/2004 | Lee | |
| 2005/0050332 A1* | 3/2005 | Serret-Avila et al. | 713/176 |
| 2005/0086501 A1 | 4/2005 | Woo et al. | |
| 2005/0141713 A1* | 6/2005 | Genevois | 380/239 |
| 2005/0149831 A1* | 7/2005 | Katsavounidis et al. | 714/776 |
| 2005/0175184 A1* | 8/2005 | Grover et al. | 380/278 |
| 2005/0180568 A1* | 8/2005 | Krause | 380/212 |
| 2005/0259821 A1* | 11/2005 | Kubota et al. | 380/228 |
| 2006/0034321 A1* | 2/2006 | Paila et al. | 370/464 |
| 2006/0069798 A1* | 3/2006 | Li et al. | 709/231 |
| 2006/0184790 A1* | 8/2006 | Oliveira et al. | 713/160 |
| 2006/0215995 A1 | 9/2006 | Tada | |
| 2006/0271983 A1* | 11/2006 | Katayama et al. | 725/100 |
| 2006/0287956 A1* | 12/2006 | Higashi et al. | 705/51 |
| 2007/0130068 A1* | 6/2007 | Kitazato et al. | 705/50 |
| 2007/0143854 A1* | 6/2007 | Wasilewski | 726/26 |

FOREIGN PATENT DOCUMENTS

| | | |
|---|---|---|
| JP | 2002-42424 A | 2/2002 |
| JP | 3435398 B2 | 6/2002 |
| JP | 2002-374511 A | 12/2002 |
| JP | 2003-100019 A | 4/2003 |
| JP | 2003-134106 A | 5/2003 |
| JP | 2003-141816 A | 5/2003 |
| JP | 2004-226969 A | 8/2004 |
| JP | 2004-303111 A | 10/2004 |
| JP | 2004-318154 A | 11/2004 |
| JP | 2004-362546 A | 12/2004 |
| JP | 2005-513839 A | 5/2005 |
| JP | 2005-160032 A | 6/2005 |
| JP | 2005-167635 A | 6/2005 |
| JP | 2005-533416 A | 11/2005 |
| KR | 10-2004-0026315 A | 3/2004 |
| KR | 10-2004-0046691 A | 6/2004 |
| KR | 10-2005-0000498 A | 1/2005 |
| KR | 10-20050076894 A | 7/2005 |
| WO | WO 03/091863 A2 | 11/2003 |
| WO | WO 2004/006559 A2 | 1/2004 |
| WO | 2005/043899 A1 | 5/2005 |
| WO | 2005/099169 A1 | 10/2005 |

OTHER PUBLICATIONS

Communication dated Jul. 17, 2012 issued by the Japanese Patent Office in counterpart Japanese Application No. 2007-123441.

Taiwanese Office Action issued on May 30, 2011 in corresponding Taiwanese application No. 096101080.

Korean Office Action issued on Jul. 15, 2011 in corresponding Korean application No. 10-2008-0034661.

* cited by examiner

FIG. 6

|     | UCI | Import | Bind Type | Usage Rule |
|-----|-----|--------|-----------|------------|
| CCI | COPY FREE | O | Device, Domain | All |
|     | COPY ONCE | O | Device | M,S,P |
|     | COPY NO MORE | N/A | - | - |
|     | COPY NEVER | X | - | - |
| BF  | ON | O | Device, Domain | All |
|     | OFF | X | - | - |

METHOD AND APPARATUS FOR IMPORTING A TRANSPORT STREAM

CROSS-REFERENCE TO RELATED PATENT APPLICATIONS

This application claims the benefit of U.S. Provisional Patent Application No. 60/773,340, filed on Feb. 15, 2006, in the U.S. Patent and Trademarks Office, and Korean Patent Application No. 10-2006-0037718, filed on Apr. 26, 2006, in the Korean Intellectual Property Office, the disclosures of which are incorporated herein in their entirety by reference.

BACKGROUND OF THE INVENTION

1. Field of the Invention

Apparatuses and methods consistent with the present invention relate to digital content protection, and more particularly, to protection of digital content in a digital rights management (DRM) system.

2. Description of the Related Art

As the world is moving from the analogue age to the digital age, more contents are being created in digitized forms. While copying of analogue content requires much time and effort, digital content can be copied easily and quickly.

Also, while the quality of analogue content is degraded in proportion to the frequency of its copying, the quality of the digital content is maintained identically regardless of the frequency of its copying. Accordingly, protection of digital content has been requested and many companies have conducted a variety of research projects for protection of digital content.

FIG. 1 illustrates a conventional digital content protection environment.

Referring to FIG. 1, in the conventional digital content protection environment a transmission stream is received through a variety of broadcasting transmission channels and digital content is designed to be protected by using information included in the transmission stream.

In particular, a U.S. organization, Cable Television Laboratories, Inc. (CableLabs), ordered that copy control information (CCI) be attached to digital content in order to control copying of the content. The CCI is 2-bit information to restrict the number of times the digital content may be copied. The types of CCI include copy free (00), copy once (01), copy no more (10) and copy never (11). "Copy free" indicates that copying the content is permitted without restriction. "Copy once" indicates that copying the content only one time is permitted. If content with the CCI set to "copy once" is copied, the CCI for that content is changed to "copy no more." "Copy never" indicates that copying the content is prohibited.

Also, in order to prohibit unrestricted redistribution of high definition (HD)-level digital content broadcast in the U.S., the U.S. Federal Communications Commission (FCC) ordered that a broadcast flag should be attached to the digital content. The broadcast flag is a 1-bit flag indicating whether or not unrestricted redistribution of digital content is prohibited. The types of broadcast flag include broadcast flag on (1) and broadcast flag off (0). "Broadcast flag on" indicates that unrestricted redistribution of digital content is not permitted, while "broadcast flag off" indicates that unrestricted redistribution of the digital content is permitted. A variety of usage constraint information (UCI), such as the CCI and broadcast flag information described above, can be added to the digital content.

To use various kinds of content received through a variety of transmission channels, a user must acquire a license from a copyright holder whenever the user uses such content. However, acquiring such a license is complicated. If the user imports the content received through the transmission channels using the user's DRM system, converts the imported content into a content file satisfying regulations of the user's DRM system, and is issued a license within the scope of the original UCI, the user is free to use the imported content file via a user's device or domain.

The importing of content refers to a process in which a license for content received from outside is issued according to a rule of the user's DRM system and the content is encrypted. That is, the importing of content involves a process of converting a content file that does not comply with the rule of the user's DRM system into a content file that does comply with the rule of the user's DRM system. The license is required to decrypt the content and use the decrypted content, and includes a content key and usage regulations, etc. The content file is a piece of content, i.e., a unit for constituting a broadcasting program including digital content, and copy control information or a license for the content.

FIG. 2 shows the structure of a conventional imported content file. Referring to FIG. 2, meta information about content is usually recorded in a header of the content.

When a content file received via a transmission channel, i.e., an independent program, comprises a plurality of content parts, each of the plurality of content parts is encrypted using a content key and thus requires a plurality of licenses. The content parts constitute a program but each includes different UCI.

A conventional DRM system that performs an import operation generates the header of the content file, encrypts received payload packets, and packages the encrypted payload packets and the header, thereby generating the content file as illustrated in FIG. 2. When the conventional DRM system imports content comprising the plurality of content parts, it is difficult to record decryption information in the header whenever the UCI of the content received from the outside changes since the size of the header is fixed.

The content file having the structure as illustrated in FIG. 2 suffers from a time delay problem in that that time is delayed when a device receives half of the content via streaming. This problem will now be described with reference to FIGS. 3A and 3B. An advanced encryption standard (AES)-128-CTR method or an AES-128-CBC method is used to encrypt content constituting a (Motion Picture Experts Group-2) MPEG-2 transport packet.

FIG. 3A illustrates encryption using the AES-128-CTR method. Referring to FIG. 3A, the AES-128-CTR method combines encryption parameters, SALT and serial numbers, calculates counter values, encrypts a content key using the counter values according to an AES algorithm, generates a key stream, and performs an exclusive or "XOR" operation on the content with the key stream, thereby completing the encryption. The encryption divides the content into 128 bits, i.e., 16 byte encryption blocks. The counter values are numbers sequentially allocated to the 16-byte encryption blocks, so that a counter value of a next encryption block is larger than that of a previous encryption block by 1.

FIG. 3B illustrates encryption using the AES-128-CBC method. Referring to FIG. 3B, the AES-128-CBC method performs the XOR operation of an initial vector used as the encryption parameter with plain text, and encrypts a resultant value using the content key according to the AES algorithm, which completes the encryption of a block. Not the initial vector, but a block encrypted in a previous stage is used as the encryption parameter to encrypt the next block, and so on.

As described with reference to FIGS. 3A and 3B, when the device pertaining to a domain receives, via streaming, half of the content file encrypted using the AES-128-CTR method or the AES-128-CBC method, the device must perform all the arithmetic operations relating to the transport packets of the other half of the content file in order to acquire an encryption parameter necessary for decrypting the transport packets of the received first half of the content file, which causes a time delay.

SUMMARY OF THE INVENTION

An apparatus and method for importing transport stream content, according to an embodiment of the present invention, generates a content file, and regularly inserts information necessary for decrypting packets into a payload of the content file, thereby increasing import and decryption efficiency.

According to an aspect of the present invention, there is provided a method of importing a first content file as a second content file, the method comprising: encrypting payload packets of the first content file; generating protection information (PI) packets including information necessary for decrypting the encrypted payload packets; and regularly inserting the generated PI packets between the payload packets of the first content file and generating a payload of the second content file.

The PI packets may have the same format as the payload packets of the first content file.

The PI packets may be MPEG-2 transport packets.

The generated PI packets may be inserted between the payload packets of the first content file so that the PI packets have the same period as program map table (PMT) packets.

The method further comprising: generating a header including index information that identifies the PI packets among the packets of the second content file; and adding the header to the payload of the second content file.

Another embodiment of the invention includes a computer readable recording medium having embodied thereon a computer program for executing the methods described above.

According to another aspect of the present invention, there is provided an apparatus for importing a first content file as a second content file, the apparatus comprising: an encryption unit encrypting payload packets of the first content file; a PI packet generation unit generating PI packets including information necessary for decrypting the encrypted payload packets; and a file generation unit regularly inserting the generated PI packets between the payload packets of the first content file and generating a payload of the second content file.

BRIEF DESCRIPTION OF THE DRAWINGS

The above and other features and advantages of the present invention will become more apparent by describing in detail exemplary embodiments thereof with reference to the attached drawings in which:

FIG. 6 illustrates a mapping table that converts UCI into a usage rule according to an embodiment of the present invention;

DETAILED DESCRIPTION OF THE INVENTION

Embodiments of the present invention will now be described more fully with reference to the accompanying drawings, in which exemplary embodiments of the invention are shown.

Figure 1:
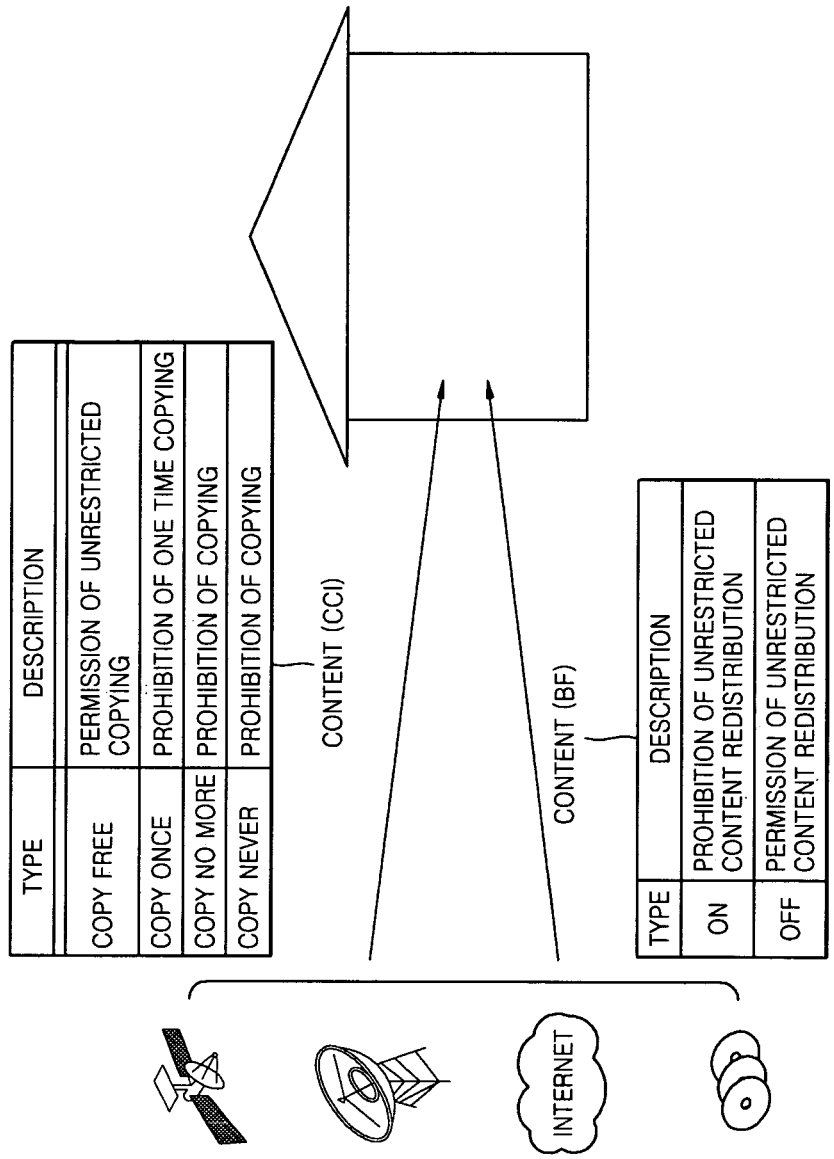
FIG. 1 illustrates a conventional digital content protection environment.
Figure 2:
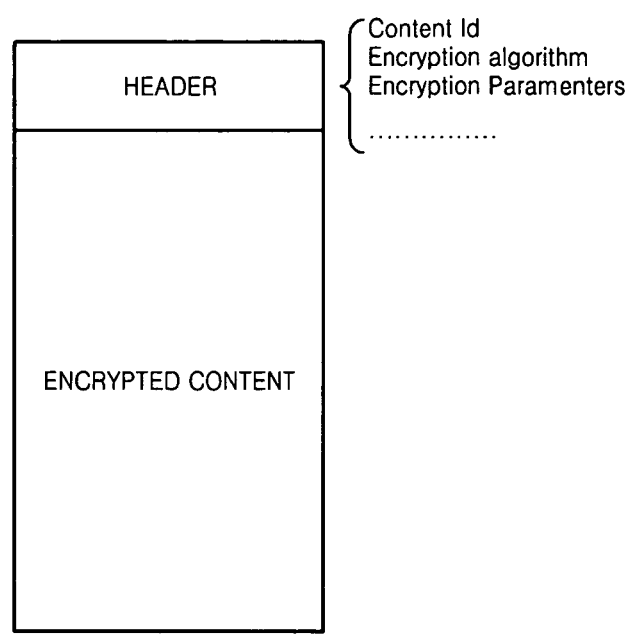
FIG. 2 shows a structure of a conventional imported content file.
Figure 3A:
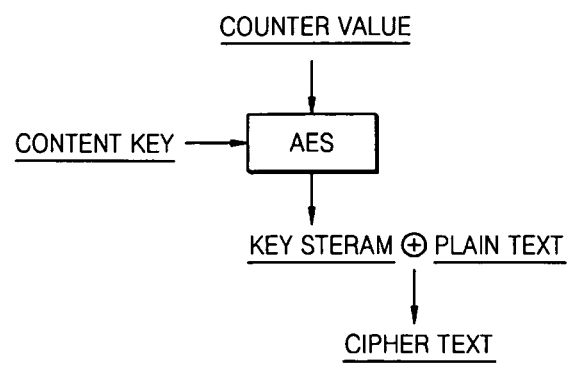
FIGS. 3A and 3B are diagrams for explaining an encryption method according to the advanced encryption standard (AES)
Figure 3B:
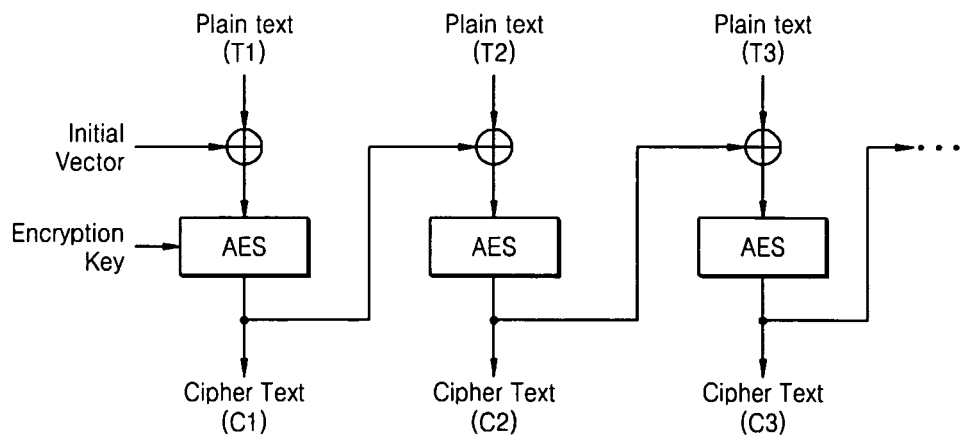
Figure 4:
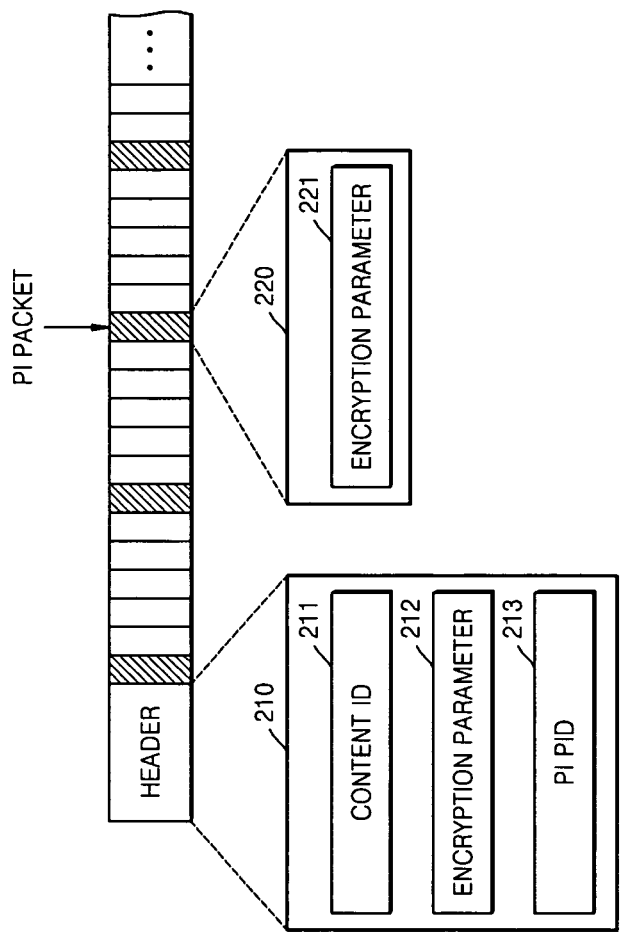
FIG. 4 is a block diagram of an imported content file according to an embodiment of the present invention.

FIG. 4 is a block diagram of an imported content file according to an embodiment of the present invention. Referring to FIG. 4, a file header 210 of the imported content file comprises a content ID 211, an encryption parameter 212, and a PI packet identifier (PID) 213.

Packets that include information necessary for decrypting payload packets are regularly inserted into a payload. These packets are referred to as protection information (PI) packets. Like other packets of the payload, the PI packets may have a format of an MPEG-2 transport packet. If the PI packets have a different format, a device that attempts to use the imported content file must have a separate module to analyze the PI packets.

While receiving content including a plurality of pieces of usage constraint information (UCI), an import apparatus inserts the PI packets including information relating to the UCI whenever changed into the payload, so that a packaging operation is effective. Although the device attempting to use the content receives only half of the content via streaming, the device can easily find the PI packets necessary for decrypting the received half of the content and also can calculate counter values necessary for decrypting transport packets of the received half of the content by using serial numbers of the PI packets.

The device has to refer to program map table (PMT) packets to reproduce the content comprising the transport packets. Therefore, the PI packets may be inserted on a regular basis into the payload at the same period (generally 0.7 second) as the PMT packets. Although the PI packets are described here as being inserted so they have the same period as the PMT packets, the PI packets can be regularly inserted into the payload on other bases. For example, as shown in FIG. 4 the PI packets can be regularly inserted after every fifth payload packet. It will be understood by persons of ordinary skill in the art that the PI packets can be inserted on a regular basis into the payload in a variety of manners.

The PI packets 220 include encryption parameters 221. The encryption parameters 221 are serial numbers used as encryption parameters when the payload packets of the imported content file are encrypted using an AES-128-CTR method. In detail, the device attempting to use the content file calculates a base counter value using SL and the serial numbers included in the PI packets 220, and decrypts encryption blocks of the payload packets based on the base counter value until a next PI packet appears.

The encryption parameter 212 of the header 210 is an initial vector when the encryption uses the AES-128-CBC method and the SALT when the encryption uses the AES-128-CTR method. Such information can be included in the PI packets; however, a probability of the change in the initial vector or the SALT in a piece of content is relatively smaller than that of the serial number. Also, the MPEG-2 transport packet has a maximum size of 184 bytes for the payload.

The content ID 211 is an identifier that identifies various pieces of content. The various pieces of content stored by the DRM system require a different license. The license includes a content ID, which is used as mapping information for identifying content and its license.

The PI PID 213 is index information required to find a PI packet. Each of the transport packets constituting the payload of the content file includes a unique packet ID (PID) in a header of the transport packet according to the kind of information included in the transport packet. Therefore, a device attempting to use the content file reads a header of the content file to find which transport packet is the PI packet.

The method of importing a piece of content including a piece of UCI has been described. However, a content file comprising a plurality of content parts can be generated by importing a piece of content including a plurality of pieces of UCI. A method of importing a piece of content including a plurality of UCI will now be described.

Figure 5:
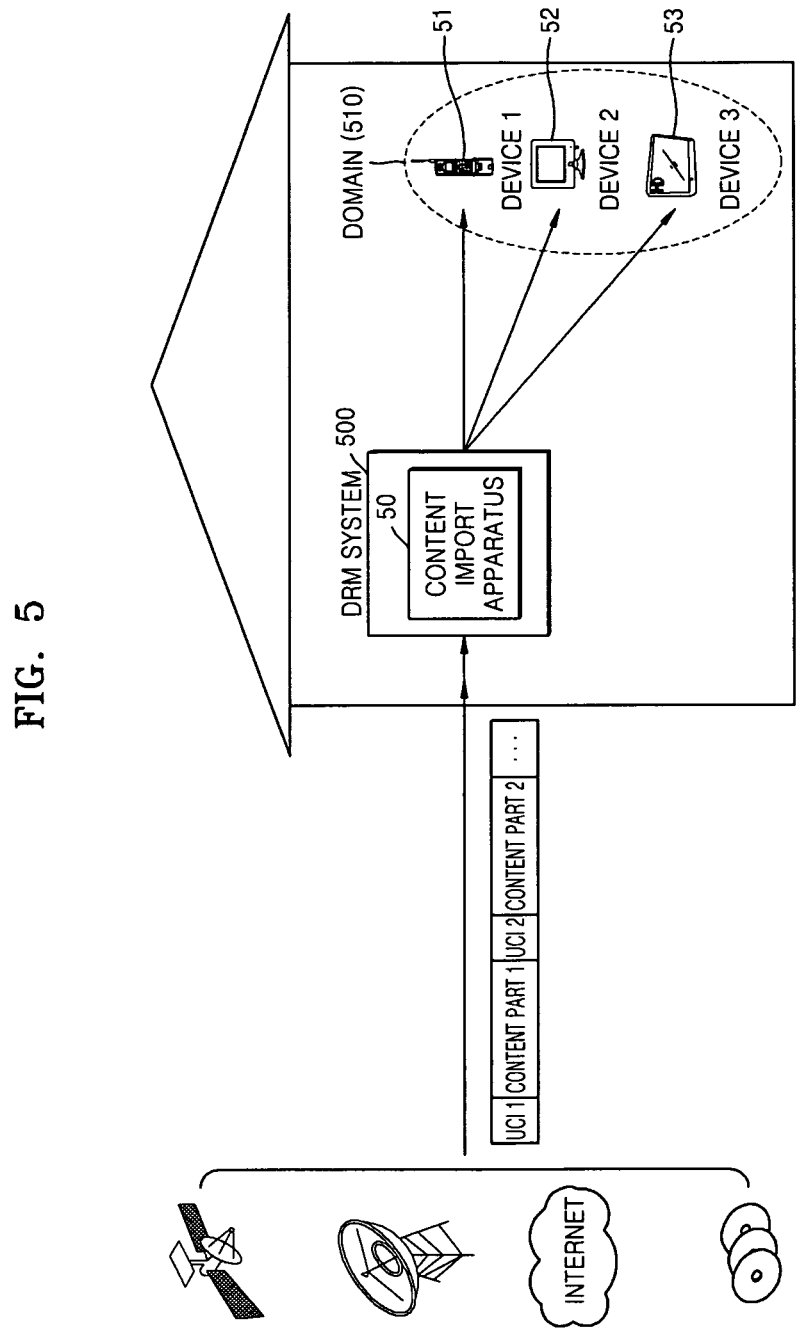
FIG. 5 illustrates an environment in which a piece of content including a plurality of pieces of usage constraint information (UCI) is imported according to an embodiment of the present invention.

FIG. 5 illustrates an environment in which a piece of content including a plurality of pieces of UCI is imported according to an embodiment of the present invention. Referring to FIG. 5, the digital content protection environment comprises a digital rights management (DRM) system 500 and a plurality of devices 51 through 53 within a domain 510, which receive a content file imported by the DRM system 500.

The DRM system 500 includes a content import apparatus 50 that imports digital content, which is protected by the conventional methods of using the copy control information and a broadcast flag, as digital content complying with a rule of the DRM system 500. The rule is designed so that it can satisfy the security requirement of content creators and content providers and at the same time can satisfy the requirement of content consumers for free usage of the content.

The content import apparatus 50 of the current embodiment of the present invention receives the content including the plurality of UCI, i.e., content including a plurality of content parts, imports the received content, and generates a content file. The imported content file can include a header in which location information, license mapping information, etc. with respect to each of the content parts are recorded. A time delay can be prevented when a device pertaining to a user's domain uses the imported content file, since the device can analyze the header, and previously acquire a usage rule or a license for using each of the content parts. Also, as described above, PI packets are regularly inserted into a payload of the content file. If the device wishing to reproduce a content file requests the imported content file, the DRM system 500 distributes content parts of the content file based on a usage rule. The device that received each of the content parts analyzes a header of the content file, finds a necessary license, acquires a content key included in the license using a device key or a domain key, and decrypts each of the content parts using the content key. The usage rules referred to by the DRM system 500 are provided according to the UCI included in a content file before being imported, which will be described with reference to FIG. 6.

FIG. 6 illustrates a mapping table that converts usage constraint information (UCI) into a usage rule according to an embodiment of the present invention. Referring to FIG. 6, the mapping table of the current embodiment of the present invention comprises a UCI field 41, an import field 42, a usage bind field 43, and a usage rule field 44. The mapping table is either a content part comprising a piece of content, or a content file including a piece of UCI. The case where the mapping table is one of the content parts will now be described.

The UCI of the content is recorded in the UCI field 41 of the mapping table. In the import field 42, a value indicating whether or not the content having the UCI recorded in the UCI field 41 can be imported is recorded. In the usage bind field 43, a usage bind type based on the UCI recorded in the UCI field is recorded. In the usage rule field 44, a usage rule is recorded in which the usage rule is based on the UCI recorded in the UCI field with respect to the usage bind type recorded in the usage bind field 43.

In particular, among values recorded in the usage rule field 44, "all" indicates that all types of usages of content are permitted. Also, among values recorded in the usage rule field 44, "M" indicates moving of content. The moving of the content means that the content stored in any one device is deleted the instant the content is stored in another device. Also, among values recorded in the usage rule field 44, "S" indicates streaming of content. The streaming of the content means that the content stored in any one device is temporarily output to another device but the content is continuously stored in the original device. Also, among values recorded in the usage rule field 44, "P" indicates playing of the content. The playing of the content means that any one device plays the content.

Since "copy free" indicates that unrestricted copying of content is permitted, if the UCI is "copy free," "device" and "domain" are recorded in the usage bind field 43 and "all" is recorded in the usage rule field 44. Meanwhile, since "copy once" indicates that only one time copying of content is permitted, if the UCI is "copy once," "device" is recorded in the usage bind field 43 and "M, S, and P" are recorded in the usage rule field 44.

In addition to the moving, streaming and playing, examples of using content includes copying content. The copying of content means that content imported according to the embodiment of the present invention is copied. However, in order for the content import apparatus 10 to import the content, copying of the content is required as a prerequisite and as a result, if the content imported according to the present embodiment is copied, the frequency of copying the content becomes twice.

Accordingly, though the content import apparatus 10 can import content with the UCI being "copy once," the content import apparatus 10 cannot permit copying of the content imported according to the present embodiment. This is why only "M, S, and P" are recorded in the usage rule field 44 when the UCI is "copy once."

Since broadcast flag "on" indicates that unrestricted redistribution of content is not permitted, if the broadcast flag is set to "on," "device" and "domain" are recorded in the usage bind field 43 and "all" is recorded in the usage rule field 44.

In the mapping table of the current embodiment of the present invention, the UCI included in the content is either copy control information (CCI) or a broadcast flag. However, a variety of pieces of UCI can be included in the content so that the mapping table can be changed from what is shown in the drawings, as would be easily understood by a person skilled in the art.

Figure 7:
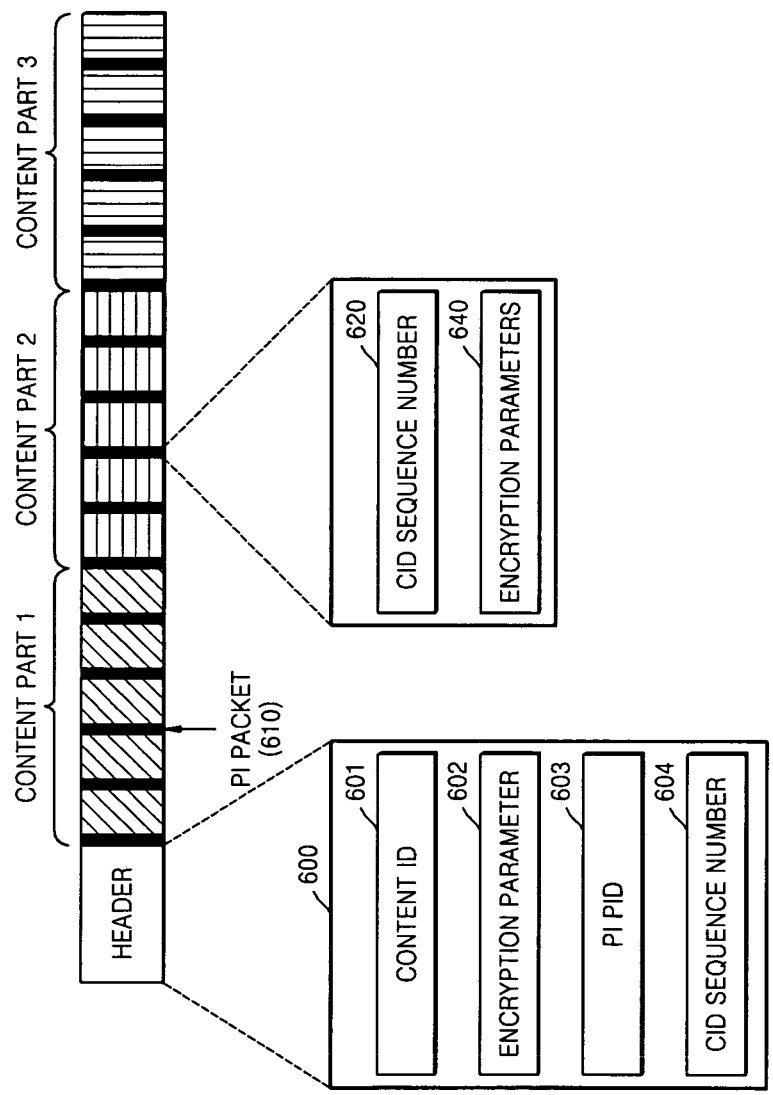
FIG. 7 illustrates a structure of a content file obtained by importing a piece of content including a plurality of pieces of UCI according to an embodiment of the present invention.

FIG. 7 illustrates a structure of a content file obtained by importing a piece of content including a plurality of pieces of UCI according to an embodiment of the present invention. In the current embodiment of the present invention, the imported content file has three content parts. In detail, the three content parts are encrypted using different content keys, and different licenses are required to use each of the three content keys.

Referring to FIG. 7, a PI packet 610 is regularly inserted into each of the three content parts, and comprises a CID sequence number 620, and an encryption parameter 640.

The CID sequence number 620 is mapping information required to find licenses necessary for using each of the three content parts. In detail, a header 600 includes the CID sequence number 604 and a content ID 601, and each of the licenses includes a content ID for each of the three content parts. Therefore, if a device attempting to use each of the three content parts finds the PI packet 610 for each of the three content parts and knows the CID sequence number 620, the device can find a necessary license among the licenses generated for the three content parts.

A DRM system provides each of the contents with a content ID for managing the contents. The content ID inserted into the PI packet 610 can be used as mapping information instead of the CID sequence number 620. However, since a type of the content ID can be based on the policy of the DRM system, the size of the content ID can be greater than a maximum size of 184 bytes for a payload of a MPEG-2 transport packet. Therefore, the PI packet 610 may use a CID sequence number 620 that is smaller than the content ID in size but can correspond to the content ID as the mapping information. For example, if the content ID is "urn:marlin:broadcast:1-0:cable:03302006:0001", the CID sequence number 620 can be "cable:03302006:0001". In the current embodiment, the CID sequence number 620 that is a part of the content ID is used as the mapping information for finding the license. However, any value types can replace the CID sequence number 620 if they are information corresponding to the content ID.

The encryption parameter 640 is an encryption parameter used to encrypt content. If the encryption parameter 640 uses the AES-128-CTR encryption method, the PI packet 610 may include a serial number. If the serial number included in each of PI packets is sequentially increased, serial numbers of encryption blocks of encrypted transport packets are determined until a next PI packet appears and counter values of the encryption blocks are known, so that the encrypted transport packets can be decrypted.

The header 600 comprises a content ID 601, an encryption parameter 602, a PI PID 603, and a CID sequence number 604. As described above, the encryption parameter 602 is an initial vector used in the AES-128-CBC method and a SALT is used in the AES-128-CTR method. The content ID 601 and the CID sequence number 604 are separately included in each of the contents. The header 600 further comprises location information indicating a start point and an end point of each of the three content parts.

Figure 8:
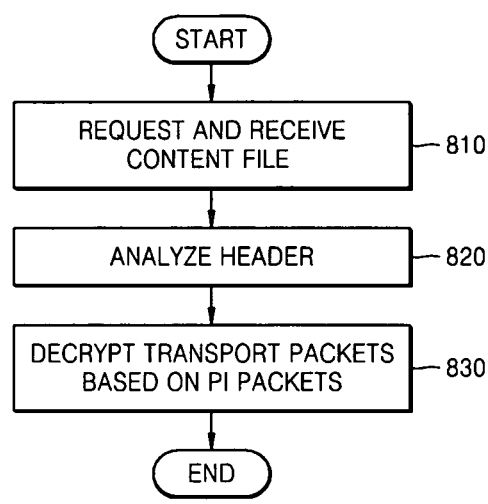
FIG. 8 is a flowchart of a process of using imported content in a device pertaining to a domain according to an embodiment of the present invention.

FIG. 8 is a flowchart of a process of using imported content in a device pertaining to a domain according to an embodiment of the present invention. Referring to FIG. 8, the device pertaining to the domain requests from an importing apparatus a content file imported from outside a user's domain, and receives the content file (Operation 810). The device analyzes information included in the header of the received content file (Operation 820). As described above, since the header of the imported content file, according to the current embodiment, includes index information required to find a PI packet, the device can easily find the PI packet in the payload, acquire a necessary encryption parameter and license based on the located PI packet, and promptly decrypt a transport packet using the acquired encryption parameter and license (Operation 830) by analyzing the header.

Figure 9:
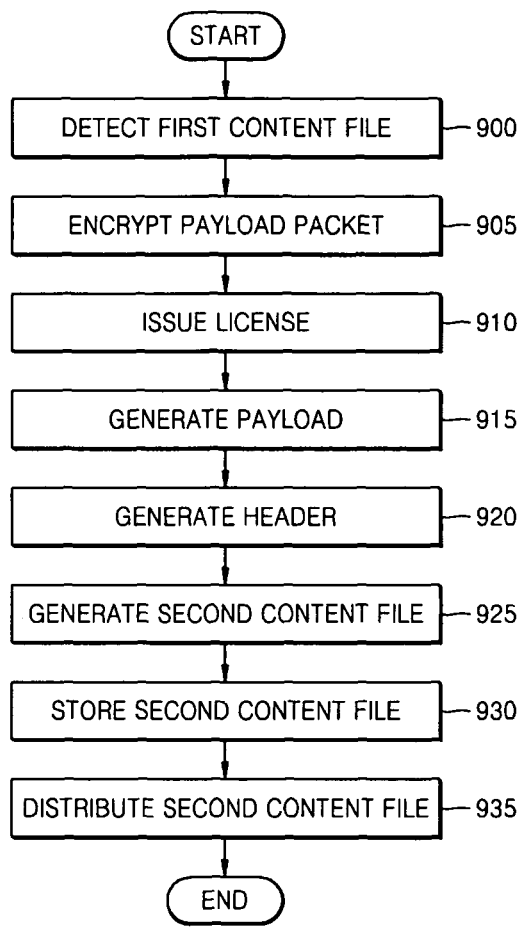
FIG. 9 is a flowchart of a content import method according to an embodiment of the present invention.

FIG. 9 is a flowchart of a method of importing content according to an embodiment of the present invention. Referring to FIG. 9, a content import apparatus receives transmission streams via transmission channels such as a cable, a satellite broadcasting channel, etc., and detects a first content file constituting a program from the transmission streams (Operation 900). The first content file comprises a plurality of content parts. At least two content parts of the plurality of content parts include different UCIs.

The content import apparatus encrypts packets constituting a payload of the first content file (Operation 905) using the AES-128-CBC method or the AES-128-CTR method, or a variety of other methods. As described above, an encryption parameter used to encrypt the packets is the initial vector used in the AES-128-CBC method and a SALT and a serial number used in the AES-128-CTR method.

If each of the content parts is encrypted, a license for each of the content parts is issued (Operation 910). The license includes an encrypted content key used to encrypt one of the content parts. A device key or a domain key is used to encrypt the content key according to the scope of usage of the content part. If the content part must be used in a specific device, the content part is encrypted using the device key. If all devices in a domain share the content part, the content part is encrypted using the domain key. Each license includes mapping information for mapping each of the content parts.

A PI packet including encryption parameters used to encrypt each of the content files and license mapping information is generated and is regularly inserted between transport packets including media information (Operation 915). A payload of a second content file is generated, and a file header including location information of each of the content parts and encryption parameters such as a packet ID of the PI packet and a SALT, etc. is generated (Operation 920). The PI packet may be inserted at the same period as a PMT packet.

If the payload and the header are generated, the generated payload and the header are packaged, the second content file is generated (Operation 925) and stored (Operation 930). The second content file is a content file obtained by importing the first content file. The import apparatus distributes the second content file to all devices in the user's domain or in response to a request of a certain device (Operation 935).

Figure 10:
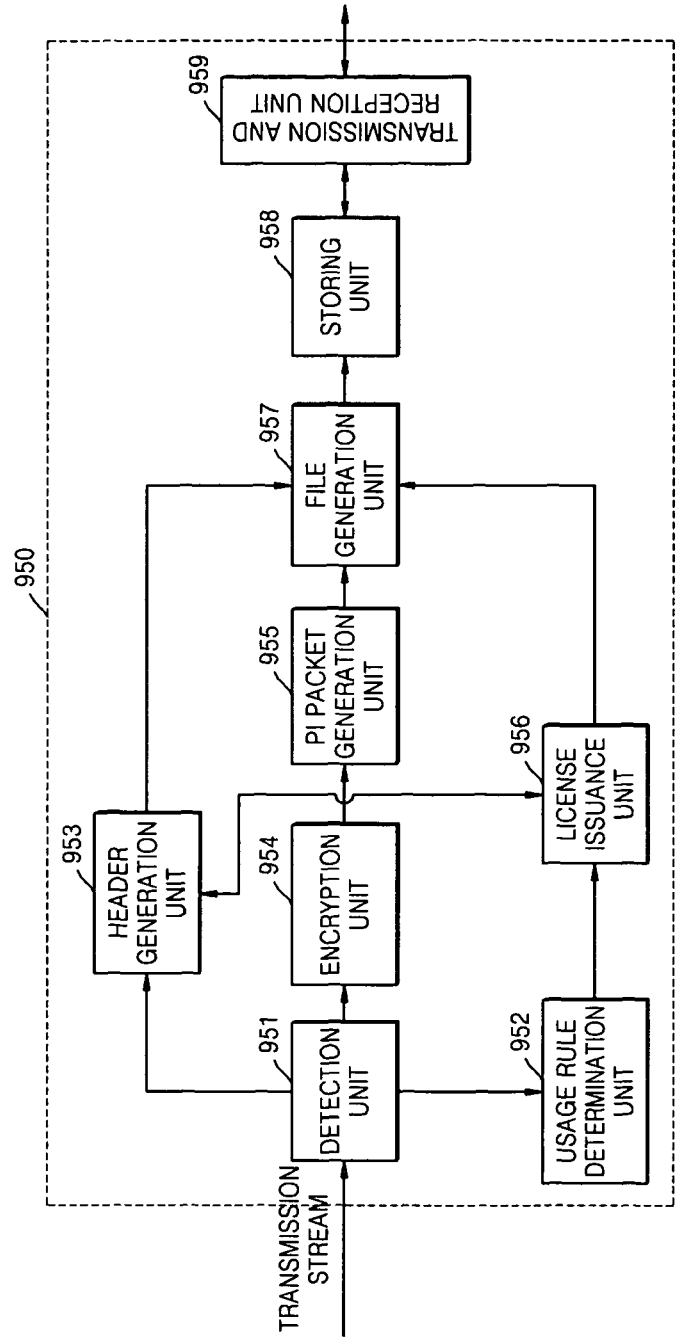
FIG. 10 is a block diagram of a content import apparatus according to an embodiment of the present invention.

FIG. 10 is a block diagram of a content import apparatus 950 according to an embodiment of the present invention. In the current embodiment, imported content includes a plurality of pieces of UCI.

Referring to FIG. 10, the content import apparatus 950 comprises a detection unit 951, a usage rule determination unit 952, a header generation unit 953, an encryption unit 954, a PI packet generation unit 955, a license issuance unit 956, a file generation unit 957, a storing unit 958, and a transmission and reception unit 959.

The detection unit 951 detects a content file constituting a program from a transmission stream received via various transmission channels outside a domain, and detects the usage constraint information (UCI) of each of the content parts from the content file. As described above, examples of the UCI may include conventional copy control information and the broadcast flag.

The usage rule determination unit 952 determines a usage rule for each of the content parts detected by the detection unit 102 based on the UCI detected by the detection unit 102.

The encryption unit 954 encrypts the content file detected by the detection unit 951, i.e., each of the content parts included in the content file which is not imported based on the UCI detected by the detection unit 102. A content key used to encrypt each of the content parts is encrypted using a device key or a domain key. If the encrypted content part must be used in a certain device, a device key for the device is used to encrypt the content key. If the encrypted content part can be shared in all of the devices of the domain, the domain key is used to encrypt the content key.

The license issuance unit 956 issues a license for each of the content parts. As described above, the license is required for the device to use the content parts, and includes a usage rule and an encrypted content key for each of the content parts.

The header generation unit 953 generates a header to be used in an imported content file. When a device in the domain attempts to use the imported content file, the header includes information for understanding the structure of the imported content file without parsing each of the transport packets and previously acquiring the license for each of the content parts. The information includes a packet ID of a PI packet, location information of each of the content parts, encryption parameters such as a SALT or an initial vector, license mapping information, etc. The license for each of the content parts may be included in the header.

The PI packet generation unit 955 generates PI packets including information necessary for decrypting a certain number of encrypted transport packets. As described above, the information includes the license mapping information and a serial number for decrypting the encrypted transport packets using the AES-128-CTR method. The PI packet is not encrypted.

The file generation unit 957 regularly inserts PI packets between the transport packets including media information, generates a payload of the imported content file, adds the header generated by the header generation unit 953 to the payload, and generates a content file. The generated content file is the imported content file.

The storing unit 958 stores the imported content file.

The transmission and reception unit 959 transmits the imported content file to a device pertaining to a user's domain in response to a request by the device.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

According to the present invention, when an import apparatus imports content received from outside of a domain, even if UCI included in the received content changes, packaging is possible. When a device pertaining to the domain receives half of an imported content file via streaming, transport packets of the received half of the imported content file can be promptly decrypted without a time delay. Also, a device capable of processing MPEG-2 transport packets can analyse the imported content file according to embodiments of the present invention using a conventional decoding unit without requiring an additional unit.

While the present invention has been particularly shown and described with reference to exemplary embodiments thereof, it will be understood by those of ordinary skill in the art that various changes in form and details may be made therein without departing from the spirit and scope of the present invention as defined by the following claims. The embodiments described here should be considered in a descriptive sense only and not for purposes of limitation. Therefore, the scope of the invention is defined not by the detailed description of the invention but by the appended claims, and all differences therebetween should be construed as being included within the scope of the present invention.

What is claimed is:

1. A method of importing a first content file as a second content file, the method comprising:
   encrypting payload packets of the first content file;
   generating protection information (PI) packets including information for decrypting the encrypted payload packets and without including content data; and
   inserting at a predetermined interval the generated PI packets between the payload packets of the first content file for generating a payload of the second content file,
   wherein the encrypted payload packets include a plurality of content parts that requires separate content keys and each of the PI packets includes mapping information for finding a content key corresponding to a content part including the PI packet among content parts of the second content file.

2. The method of claim 1, wherein the PI packets have the same format as the payload packets of the first content file.

3. The method of claim 2, wherein the PI packets and the payload packets of the first content file are MPEG-2 transport packets.

4. The method of claim 3, wherein the generated PI packets are inserted between the payload packets of the first content file so that the PI packets have the same period as program map table (PMT) packets.

5. The method of claim 1, wherein the payload packets of the first content file are encrypted using an AES-128-CTR method, and each of the PI packets includes a serial number for decrypting a predetermined number of the encrypted payload packets.

6. The method of claim 1, further comprising:
   generating a header including index information that identifies the PI packets among the packets of the second content file; and
   adding the header to the payload of the second content file.

7. A non-transitory computer readable recording medium having embodied thereon a computer program for executing a method of claim 1.

8. The method of claim 1, wherein each of the generated PI packets comprise mapping information that identifies a license, where said mapping information is a part of a content identifier stored in a header of the first content file information, and a serial number identifying a number of the payloads packets that are to be decrypted using the respective generated PI packet.

9. The method of claim 1, wherein a header of the content file comprises a content identifier and a PI location identification information, wherein a sequence number stored in the generated PI packets comprises mapping information and is part of the content identifier, and wherein the PI location identification information identifies locations of the PI packets stored between the payload packets.

10. The method of claim 1, wherein size or number of the PI packets varies depending on size of copy control information.

11. The method of claim 1, wherein the PI packets comprise control information for decrypting the encrypted payload packets that are inserted between the PI packets such that at least one PI packet is placed between two of the encrypted payload packets that are decrypted with the control information in the at least one PI packet.

12. The method of claim 1, wherein at least two of the generated PI packets are transmitted together with at least two of the payload packets.

13. An apparatus for importing a first content file as a second content file, the apparatus comprising:
- an encryption unit encrypting payload packets of the first content;
- a PI packet generation unit executed by a computer generating protected information (PI) packets including information for decrypting the encrypted payload packets and without including content data; and
- a file generation unit which is configured to insert at a predetermined interval the generated PI packets between the payload packets of the first content file for generating a payload of the second content file,
- wherein the encrypted payload packets include a plurality of content parts that requires separate content keys and each of the PI packets includes mapping information for finding a content key corresponding to a content part including the PI packet among content parts of the second content file.

14. The apparatus of claim 13, wherein the PI packets have the same format as the payload packets of the first content file.

15. The apparatus of claim 14, wherein the PI packets and the payload packets of the first content file are MPEG-2 transport packets.

16. The apparatus of claim 15, wherein the file generation unit inserts the generated PI packets between the payload packets of the first content file so that the PI packets have the same period as program map table (PMT) packets.

17. The apparatus of claim 13, wherein the encryption unit encrypts the payload packets of the first content file using an AES-128-CTR method, and each of the PI packets includes a serial number for decrypting a predetermined number of the encrypted payload packets.

18. The apparatus of claim 13, further comprising:
- a header generation unit generating a header including index information that identifies the PI packets among the packets of the second content file,
- wherein the file generation unit adds the header to the payload of the second content file.

19. A method of decrypting content, comprising:
- receiving a portion of a content file containing a header and a payload, the payload containing a plurality of payload packets and a plurality of protection information (PI) packets inserted on at a predetermined interval among the payload packets, and the header including a PI packet identifier containing information for locating at least one of the PI packets within the payload, wherein PI packets contain information necessary for decrypting the payload packets and without including content data;
- locating at least one of the PI packets by analyzing the header to detect a location of the PI packet;
- decrypting a payload packet based on the information contained in the located PI packet,
- wherein the encrypted payload packets include a plurality of content parts that requires separate content keys and each of the PI packets includes mapping information for finding a content key corresponding to a content part including the PI packet among content parts of the second content file.

20. The method according to claim 19, wherein a portion of the content file is received as a stream of data and said payload packet is decrypted prior to receipt of the entire content file.

21. The method according to claim 20, wherein the payload packets of the content file are encrypted according to an AES-128-CTR encryption method, and the located PI packet includes a serial number for decrypting one or more of the encrypted payload packets.

22. A non-transitory computer readable storage medium having recorded therein a content file,
- wherein the content file comprising:
    - a payload containing a plurality of encrypted payload packets and a plurality of protection information (PI) packets inserted at a predetermined interval among the encrypted payload packets; and
    - a header containing a PI packet identifier for identifying a location of at least one of the PI packets within the payload, and
    - wherein the PI packets contain information necessary for decrypting one or more of the encrypted payload packets and without including content data,
    - wherein the encrypted payload packets include a plurality of content parts that requires separate content keys and each of the PI packets includes mapping information for finding a content key corresponding to a content part including the PI packet among content parts of the second content file.

* * * * *